(12) United States Patent
He

(10) Patent No.: US 8,406,466 B2
(45) Date of Patent: Mar. 26, 2013

(54) CONVERTING AIRCRAFT ENHANCED VISION SYSTEM VIDEO TO SIMULATED REAL TIME VIDEO

(75) Inventor: Gang He, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 894 days.

(21) Appl. No.: 12/637,150

(22) Filed: Dec. 14, 2009

(65) Prior Publication Data

US 2011/0142281 A1  Jun. 16, 2011

(51) Int. Cl.
*G06K 9/00* (2006.01)
*G08G 1/123* (2006.01)

(52) U.S. Cl. .................. 382/103; 382/154; 340/988

(58) Field of Classification Search .......... 382/103, 382/154, 284, 285, 293, 294; 340/966, 971, 340/973, 974, 975, 980; 701/4, 14; 345/156
See application file for complete search history.

(56) References Cited

U.S. PATENT DOCUMENTS

| | | | |
|---|---|---|---|
| 7,148,861 B2 * | 12/2006 | Yelton et al. | 345/8 |
| 7,355,179 B1 * | 4/2008 | Wood et al. | 250/339.11 |
| 7,403,133 B2 * | 7/2008 | He et al. | 340/974 |
| 7,471,214 B2 * | 12/2008 | Feyereisen et al. | 340/949 |
| 7,486,291 B2 * | 2/2009 | Berson et al. | 345/427 |
| 7,605,774 B1 | 10/2009 | Brandt et al. | |
| 8,200,433 B1 * | 6/2012 | Siniff et al. | 701/540 |
| 2004/0169617 A1 * | 9/2004 | Yelton et al. | 345/1.1 |
| 2005/0007261 A1 | 1/2005 | Berson et al. | |
| 2005/0007386 A1 * | 1/2005 | Berson et al. | 345/633 |
| 2006/0066459 A1 | 3/2006 | Burch et al. | |
| 2007/0018887 A1 | 1/2007 | Feyereisen et al. | |
| 2009/0212994 A1 * | 8/2009 | Hamza et al. | 342/107 |

FOREIGN PATENT DOCUMENTS

EP  1453010 A2  1/2004

OTHER PUBLICATIONS

Pasman, W. et al.; Accurate overlaying for mobile augmented reality, Computers & Graphics 23 (1999) 875-881.
EP Search Report, EP 10191441.4-2221 dated Mar. 29, 2011.
EP Communication, EP 10191441.4-2221 dated Apr. 5, 2011.
EP Communication, EP 10191441.4-2221 dated Dec. 13, 2011.

* cited by examiner

*Primary Examiner* — Andrae S Allison
(74) *Attorney, Agent, or Firm* — Ingrassia Fisher & Lorenz, P.C.

(57) ABSTRACT

A method for overcoming image latency issues of a synthetic vision system include generating (602, 704) a video comprising a plurality of images (300, 400, 500) of a target (208, 212) viewed from a moving platform (202), enhancing (604, 704) the resolution of the video, processing (606, 706) a parameter of the moving platform (202) related to the relative position of the platform to the target (208, 212), adjusting each of the plurality of images based on the processed parameter to simulate a real time video, and displaying (610, 710) the simulated real time video.

20 Claims, 6 Drawing Sheets

CONVERTING AIRCRAFT ENHANCED VISION SYSTEM VIDEO TO SIMULATED REAL TIME VIDEO

FIELD OF THE INVENTION

The present invention generally relates to the display of target images to an aircrew and more particularly to converting and displaying a target image, such as a simulated landing environment, to a real time image.

BACKGROUND OF THE INVENTION

Pilots typically rely on both ground references and instruments when navigating from one point to another. Aircraft flying at 35,000 feet generally rely more on instruments while aircraft flying close to the ground typically rely more on ground references. During approach and landing, they may rely more on ground references if the weather permits.

The approach to landing and touch down on the runway of an aircraft is probably the most challenging task a pilot undertakes during normal operation. To perform the landing properly, the aircraft approaches the runway within an envelope of attitude, course, speed, and rate of descent limits. The course limits include, for example, both lateral limits and glide slope limits. An approach outside of this envelope can result in an undesirable positioning of the aircraft with respect to the runway, resulting in possibly discontinuance of the landing attempt.

In some instances visibility may be poor during approach and landing operations. Images taken from an on-board camera are displayed to the aircrew for reference, providing a better understanding of the environment ahead of the aircraft. As the aircraft closes on the runway, the pilot may reference both the display and the actual view outside of the aircraft.

The next generation of aircraft synthetic vision systems, or display systems in general, will use photo realistic textures on the terrain and other three dimensional objects such as buildings. However, Enhanced Vision Systems (EVS) images, for example, from an InfraRed camera, typically produce video output of lower resolution with substantial image noise, often due to inherent limitation of both device, physics, and external conditions, thereby impeding a pilot's recognition and understanding of the object or objects being displayed leading to significant target recognition and high training requirements for flight crews. One approach to improve image quality is to use an averaging or super-resolution approach in which image features may be extracted, sub-pixel-shifted, and averaged. Although such enhancing approaches can produce significantly improved images with increased resolution and feature definition, they typically introduce significant delays detrimental to aircraft control, particularly when such EVS images are presented onto a heads-up-display or a heads-down primary flight display for approach and landing operations. Because of the delay introduced by the enhancing process, the video (or images) displayed on the screen were equivalent to the images taken at an earlier time, for example, approximately 1 to 2 seconds earlier, when the aircraft was further away from the target. Therefore, the images displayed are not current.

Accordingly, it is desirable to provide a method and system for displaying clearer enhanced and synthetic vision system images in real time. Furthermore, other desirable features and characteristics of the present invention will become apparent from the subsequent detailed description and the appended claims, taken in conjunction with the accompanying drawings and the foregoing technical field and background.

BRIEF SUMMARY OF THE INVENTION

A method for overcoming image latency issues of a enhanced vision system includes generating a video comprising a plurality of images of a target viewed from a moving platform, enhancing the resolution of the video, processing a parameter of the moving platform related to the relative position of the platform to the target, adjusting each of the plurality of images based on the processed parameter to simulate a real time video, and displaying the simulated real time video.

An apparatus for overcoming image latency issues includes an image procuring apparatus configured to procure a video including a plurality of images of a target viewed from a moving platform; a processor configured to enhance the images, process at least one parameter of the moving platform related to the relative position of the platform to the target, and adjust the procured images based on the processed at least one parameter; and a display configured to display the adjusted images.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding technical field, background, brief summary, or the following detailed description.

An approach is described herein for overcoming image latency issues of an Enhanced Vision System (EVS) that uses, for example, on-board GPS, inertial, and attitude sensors to quicken the enhanced video image so it is displayed with the correct visual dimensions for the current position of the aircraft for approach and landing operations. For example, when an aircraft approaches a runway, the actual images on the ground increase in size. By enlarging the displayed image, when the aircraft is approaching the target, to match a time interval between fixed time intervals of the otherwise displayed enhanced images, the flight crew does not experience any significant delays in the image display, resulting in improved image quality for typical approach and landing operations in low visibility conditions. An effective delay interval compatible with the approach profile and attitude change is computed and the image display enlargement and position shift is correlated with the imaging sensor apertures and flight profiles.

While the exemplary embodiments described herein refer to an aircraft and a landing environment, the invention would apply to other moving platforms, including land, sea, or space vehicles in relation to any target, for example, other vehicles, turn points, and obstacles. Furthermore, the platform may be stationary while the target is in motion, or both the platform and target may both be moving.

Figure 1:
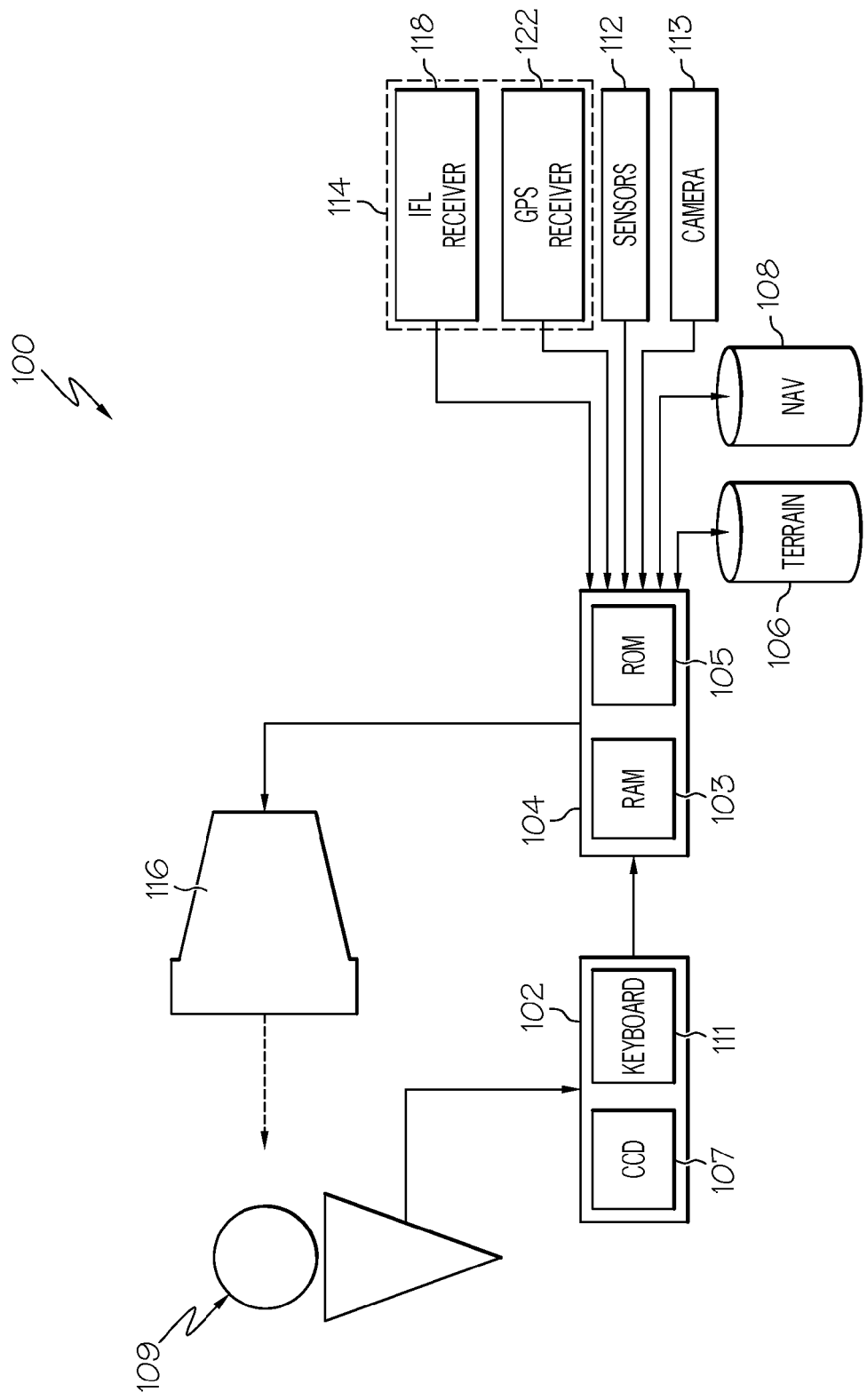
FIG. 1 is a functional block diagram of a flight display system according to an exemplary embodiment.

Referring to FIG. 1, an exemplary flight deck display system 100 is depicted and will be described. The system 100 includes a user interface 102, a processor 104, one or more terrain databases 106, one or more navigation databases 108, various sensors 112, a enhanced vision system camera 113, various external data sources 114, and a display device 116. The user interface 102 is in operable communication with the processor 104 and is configured to receive input from a user 109 (e.g., a pilot) and, in response to the user input, supply command signals to the processor 104. The user interface 102 may be any one, or combination, of various known user interface devices including, but not limited to, a cursor control device (CCD) 107, such as a mouse, a trackball, or joystick, and/or a keyboard, one or more buttons, switches, or knobs. In the depicted embodiment, the user interface 102 includes a CCD 107 and a keyboard 111. The user 109 uses the CCD 107 to, among other things, move a cursor symbol on the display screen (see FIG. 2), and may use the keyboard 111 to, among other things, input textual data.

The processor 104 may be any one of numerous known general-purpose microprocessors or an application specific processor that operates in response to program instructions. In the depicted embodiment, the processor 104 includes on-board RAM (random access memory) 103, and on-board ROM (read only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 104 may be implemented using various other circuits, not just a programmable processor. For example, digital logic circuits and analog signal processing circuits could also be used.

No matter how the processor 104 is specifically implemented, it is in operable communication with the terrain databases 106, the navigation databases 108, and the display device 116, and is coupled to receive various types of inertial data from the various sensors 112, and various other avionics-related data from the external data sources 114. The processor 104 is configured, in response to the inertial data and the avionics-related data, to selectively retrieve terrain data from one or more of the terrain databases 106 and navigation data from one or more of the navigation databases 108, and to supply appropriate display commands to the display device 116. The display device 116, in response to the display commands, selectively renders various types of textual, graphic, and/or iconic information. The preferred manner in which the textual, graphic, and/or iconic information are rendered by the display device 116 will be described in more detail further below. Before doing so, however, a brief description of the databases 106, 108, the sensors 112, and the external data sources 114, at least in the depicted embodiment, will be provided.

The terrain databases 106 include various types of data representative of the terrain over which the aircraft is flying, and the navigation databases 108 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraft approach information. It will be appreciated that, although the terrain databases 106 and the navigation databases 108 are, for clarity and convenience, shown as being stored separate from the processor 104, all or portions of either or both of these databases 106, 108 could be loaded into the RAM 103, or integrally formed as part of the processor 104, and/or RAM 103, and/or ROM 105. The terrain databases 106 and navigation databases 108 could also be part of a device or system that is physically separate from the system 100.

The sensors 112 may be implemented using various types of inertial sensors, systems, and or subsystems, now known or developed in the future, for supplying various types of inertial data. The inertial data may also vary, but preferably include data representative of the state of the aircraft such as, for example, aircraft speed, heading, altitude, and attitude.

The camera is preferably an Enhanced Vision System camera taking InfraRed images, but may be any type of camera such as a millimeter wave radar (MMW) based imaging device. An InfraRed or MMW camera is preferred because of its ability to record images in inclement weather.

The number and type of external data sources 114 may also vary. For example, the external systems (or subsystems) may include, for example, a terrain avoidance and warning system (TAWS), a traffic and collision avoidance system (TCAS), a runway awareness and advisory system (RAAS), a flight director, and a navigation computer, just to name a few. However, for ease of description and illustration, only an instrument landing system (ILS) receiver 118 and a global position system (GPS) receiver 122 are depicted in FIG. 1, and will now be briefly described.

As is generally known, the ILS is a radio navigation system that provides aircraft with horizontal (or localizer) and vertical (or glide slope) guidance just before and during landing and, at certain fixed points, indicates the distance to the reference point of landing on a particular runway. The system includes ground-based transmitters (not illustrated) that transmit radio frequency signals. The ILS receiver 118 receives these signals and, using known techniques, determines the glide slope deviation of the aircraft. As is generally known, the glide slope deviation represents the difference between the desired aircraft glide slope for the particular runway and the actual aircraft glide slope. The ILS receiver 118 in turn supplies data representative of the determined glide slope deviation to the processor 104.

The GPS receiver 122 is a multi-channel receiver, with each channel tuned to receive one or more of the GPS broadcast signals transmitted by the constellation of GPS satellites (not illustrated) orbiting the earth. Each GPS satellite encircles the earth two times each day, and the orbits are arranged so that at least four satellites are always within line of sight from almost anywhere on the earth. The GPS receiver 122, upon receipt of the GPS broadcast signals from at least three, and preferably four, or more of the GPS satellites, determines the distance between the GPS receiver 122 and the GPS satellites and the position of the GPS satellites. Based on these determinations, the GPS receiver 122, using a technique known as trilateration, determines, for example, aircraft position, groundspeed, and ground track angle. These data may be supplied to the processor 104, which may determine aircraft glide slope deviation therefrom. Preferably, however, the GPS receiver 122 is configured to determine, and supply data representative of, aircraft glide slope deviation to the processor 104.

The display device 116, as noted above, in response to display commands supplied from the processor 104, selectively renders various textual, graphic, and/or iconic information, and thereby supply visual feedback to the user 109. It will be appreciated that the display device 116 may be implemented using any one of numerous known display devices suitable for rendering textual, graphic, and/or iconic information in a format viewable by the user 109. Non-limiting examples of such display devices include various cathode ray tube (CRT) displays, and various flat panel displays such as various types of LCD (liquid crystal display) and TFT (thin film transistor) displays. The display device 116 may additionally be implemented as a panel mounted display, a HUD (head-up display) projection, or any one of numerous known technologies. It is additionally noted that the display device 116 may be configured as any one of numerous types of aircraft flight deck displays. For example, it may be configured as a multi-function display, a horizontal situation indicator, or a vertical situation indicator, just to name a few. In the depicted embodiment, however, the display device 116 is configured as a primary flight display (PFD).

Figure 2:
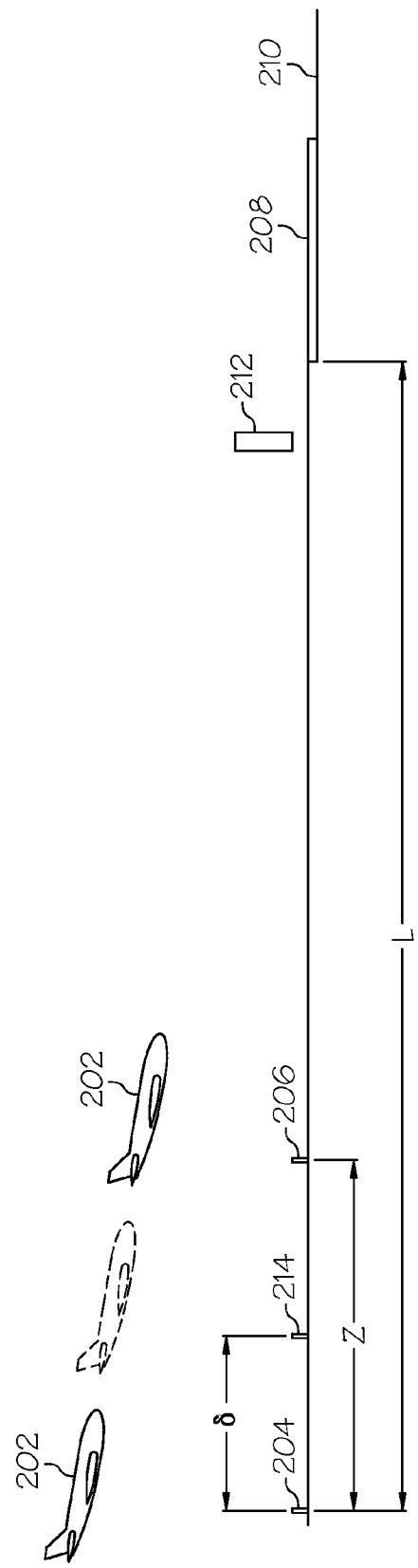
FIG. 2 is a side view representation of an aircraft approaching a runway.
Figure 3:
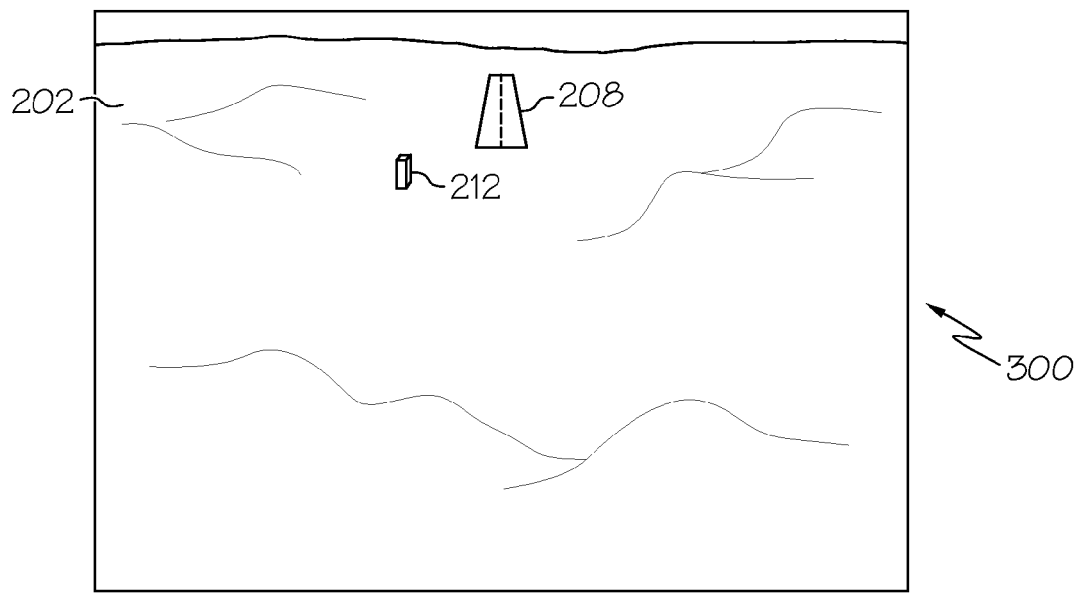
FIG. 3 is an exemplary image of a landing environment taken from the aircraft at a first distance from the runway that may be rendered on the flight display system of FIG. 1 in accordance with an exemplary embodiment.

FIG. 2 is a side view representation of an aircraft 202 at times 204, 206 approaching a runway 208 above the terrain 210. A video taken from the aircraft 202 by a camera 113 at time 204 without any enhancing delay is represented by the image 300 on the display in FIG. 3, and a video taken from the aircraft 202 at time 206 without any enhancing delay is represented by the image 400 on the display in FIG. 4. As the aircraft 202 gets closer to the runway 208 and obstacle 212, they appear larger (the runway 208 and obstacle 212 appear larger at time 206 in FIG. 4 than at time 206 in FIG. 3).

Figure 4:
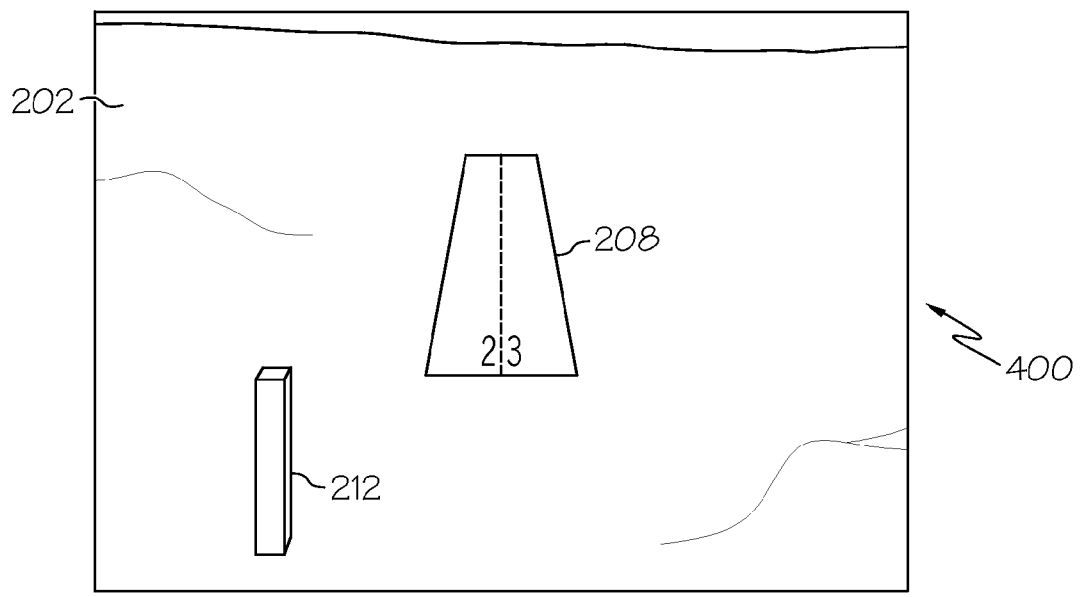
FIG. 4 is an exemplary image of a landing environment taken from the aircraft at a second distance from the runway that may be rendered on the flight display system of FIG. 1 in accordance with an exemplary embodiment.
Figure 5:
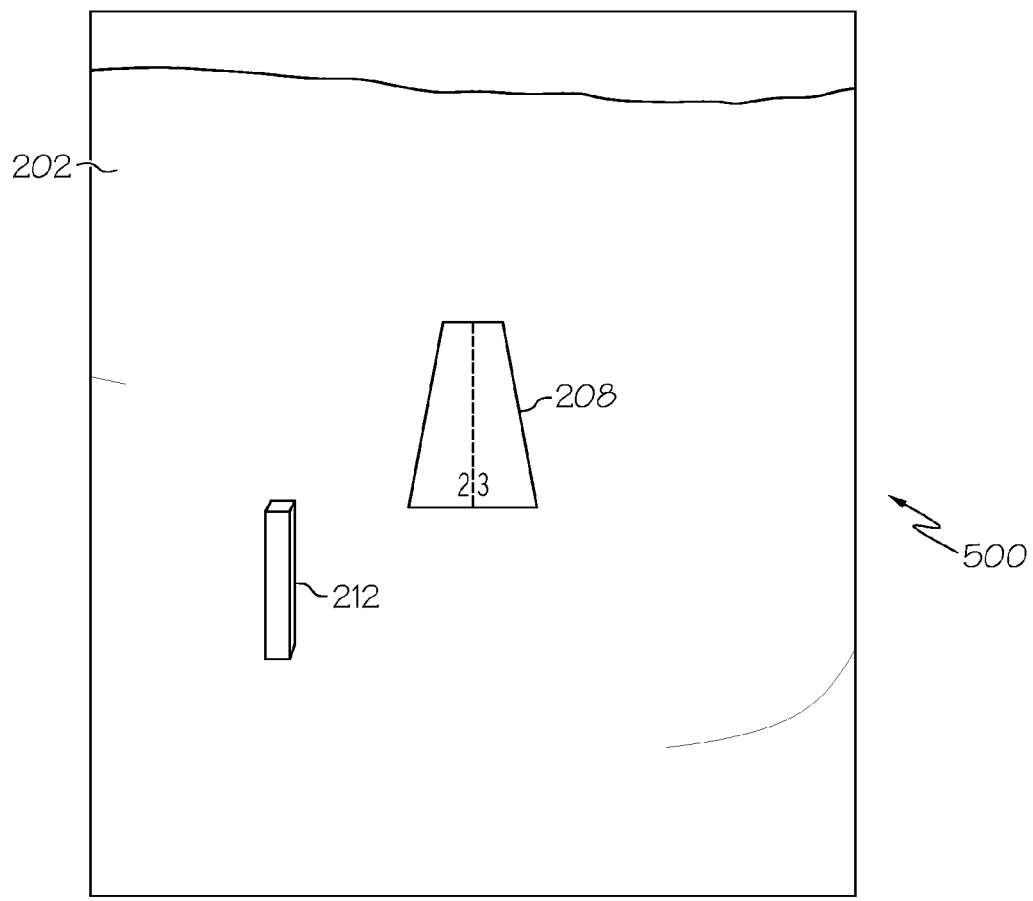
FIG. 5 is an exemplary image of a landing environment taken from the aircraft at a third distance from the runway that may be rendered on the flight display system of FIG. 1, when the aircraft is at the second distance, in accordance with an exemplary embodiment.

However, as the enhanced vision system camera 113 procures a video stream from the aircraft 202 of the target at a distance (time 214), the video stream is then sent into a image processing unit which introduces delays, and the processed video images is displayed as the image 500 in FIG. 5. The delay introduced in the image processing would mean that the image displayed at time 206 was more or less equivalent to the real-time image taken at time 214 because of the delay (see the displayed image 500 of FIG. 5). Therefore, at time 206 when the image outside the cockpit actually should appear as the image 400 shown in FIG. 4, the smaller image 500 (FIG. 5) is actually displayed.

In accordance with the exemplary embodiment, aircraft and/or synthetic vision system characteristics are used to adjust the image by displaying the runway 208 and structure 212 on the graphical display 116 to the size, angle and the like for the current position of the aircraft, thereby enabling flight crews to maintain overall awareness but also enable flight crews who are unfamiliar with the flight path or an airport, for example, to maintain overall awareness of their current position. For example, if the aircraft is at the position 206 for which the image 400 of FIG. 4 should be displayed, the image 500 is adjusted (as well as enhanced) to the size (as shown in FIG. 4) the aircrew would see in the actual outside view of the runway.

Additional information (not shown) is typically provided on the display 116 in graphic, iconic, or numerical format representative of, for example, an altitude indicator, an airspeed indicator, an attitude indicator, a compass, an extended runway centerline, and a flight path vector indicator, glide slope, altimeter setting, and navigation receiver frequencies.

Flight crews therefore can better confirm position information by merely observing the size, position, and angle of the runway 208 and structure 212, for example, on the display 116 and comparing it with the view outside the aircraft.

While the exemplary embodiment described herein is a display system for an aircraft, other types of platforms, such as water craft, may also utilize the apparatus and method claimed. One important aspect of situational awareness is to be aware of a target, and obstacles which pose a threat to the craft. This is particularly true for aircraft during take-off and landing or other low altitude operations and even more so in low visibility conditions. Terrain and obstacle images should be presented in such a way that it will provide timely awareness of the height, location, and distance of possible threats without distracting from the other primary information on the display. In order to successfully reach the runway and avoid obstacles, the operator will have a short response time in which to determine how to best avoid obstacles.

On many occasions, terrain or an obstacle may be considered a marker, or an identification point, informing the pilot of his position with respect to a desired flight path or a targeted runway, for example. In this case, while the terrain 210 or structure 212 may not be much of a hazard to flight safety, it may assist the pilot in determining his position relative to the obstacle.

The processor 104 obtains a picture from the EVS for display on the display 116 representative of the position of the aircraft with respect to the runway 208 and structure 212. The processor 104 may be configured to receive and process navigation and positional data, for example, position, speed, direction) regarding current aircraft location from the navigation database 108.

The terrain database 106 and obstacle database 112 may contain data regarding terrain and structures, respectively, and more specifically pictures, wherein the processor 104 sends a signal to the display 116 to render pictorial images of the structures, wherein the processor 104 sends a signal to display the image based on the positional data.

Notably, the visibility of the information displayed on the screen of visual display 116 may be enhanced responsive to algorithms (e.g., implemented in software) executed by the processor 104, which functions to determine aircraft flight characteristics, and initially loads a patch of terrain and obstacle data for a region that is suitably sized to provide a rapid initialization of the data, the data correction, and also sized for a reasonable amount of flight time. The processor 104 monitors the aircraft characteristics, and continuously adjusts the image for the correct distance and/or angle from the target. Notably, for this example embodiment, the processor 104 can execute the data loading operations separately from the operations that determine the aircraft's current position, heading and speed, in order to maintain a constant refresh rate and not interfere with the continuity of the current display of the target.

Figure 6:
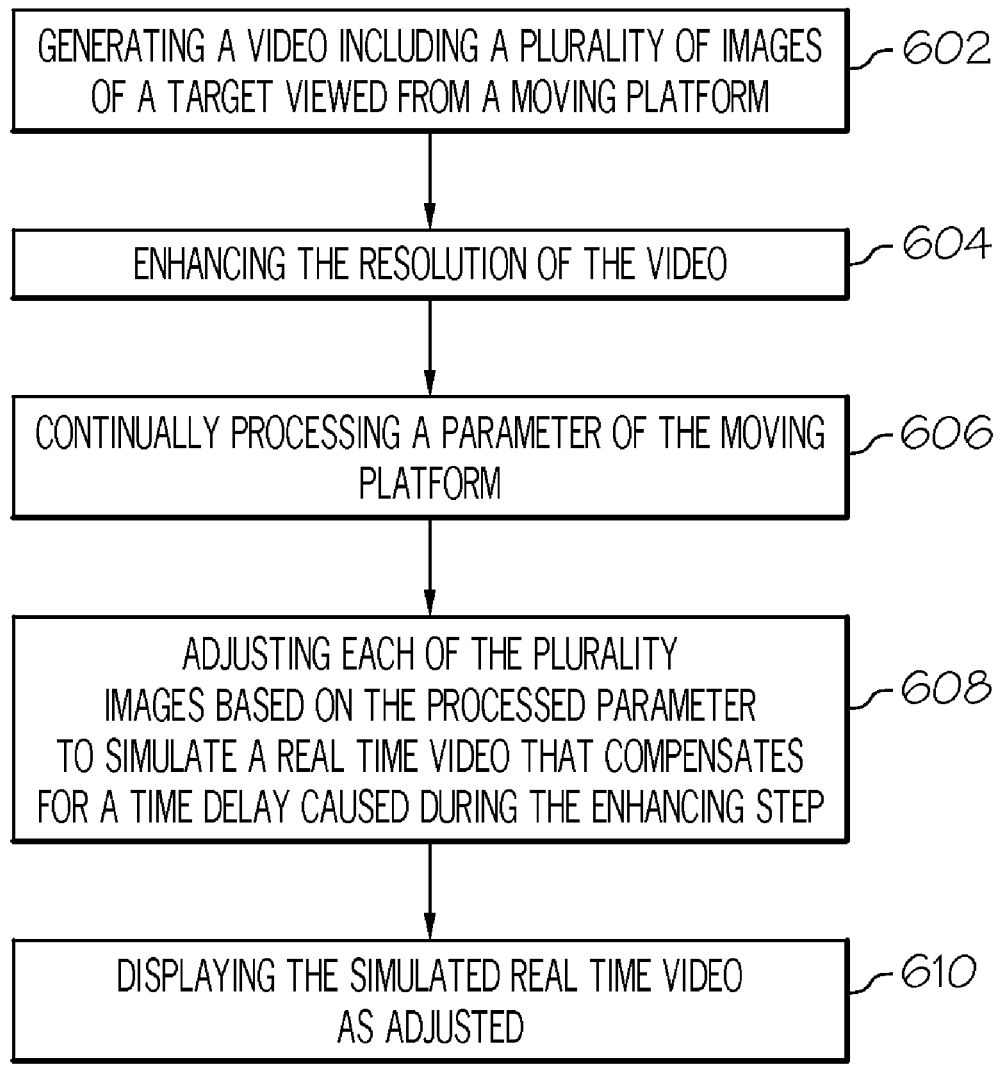
FIG. 6 is a flow chart of the steps illustrating a first exemplary embodiment.

In accordance with a first exemplary embodiment as described in the flow chart of FIG. 6, a video comprising a plurality of images of a target viewed from a moving platform are generated 602. In the exemplary embodiment, the platform is the aircraft 202 and the target is the runway 208. The images are procured 602 preferably from an on-board Enhanced Vision System (EVS) 113 coupled to the GPS 122, and inertial and altitude sensors 112.

The processor 104 enhances 604 the resolution of the video and processes 606 a parameter from the moving platform. The parameters may include, for example, coordinates on the ground above which the aircraft is positioned, aircraft altitude change rate, attitude, pitch and roll, heading, speed, inertial accelerations, distance to the target, glide slope to the target. The parameters may also include, for example, characteristics of the camera 113 including zoom setting, horizontal and vertical viewing angle of the camera, focal length, and setting based on available reflection conditions based on environmental conditions such as mist and rain.

The procured images are adjusted 608 based on the processed parameters to simulate a real time image that compensates for a time delay caused during the enhancing step. For example, when the aircraft is at the point of flight 206 wherein the image of FIG. 4 accurately conveys the proper detail (size) of the runway 206 and structure 208, the earlier taken image taken at time 214 is adjusted to appear as the image should appear at time 206 (FIG. 4), and is displayed 610. This real time video more accurately reflects the correct image as viewed by the aircrew.

Since the super (enhanced) resolution image requires a fixed amount of time to generate from multiple frames of previous images, the distance δ traveled by the aircraft 202 (FIG. 2) during this fixed amount of time may be calculated from the equation $\delta = Z - t_s V$, where δ is the distance between times 204 and 214, Z is the distance from time 204 to time 206 based on computations from the GPS system 122 or inertial navigation, $t_s$ is the time to travel the distance between 204 and 214, and V is the speed of the aircraft 202. Thusly, the image is enlarged (in this linear example) to provide a simulated real time image. The linear factor for the described straight in approach by the aircraft 202 to the runway 208 is $E = (L - \delta - Z)/(L - \delta)$, where L is the from the aircraft 202 at time 204 to the runway 208.

Figure 7:
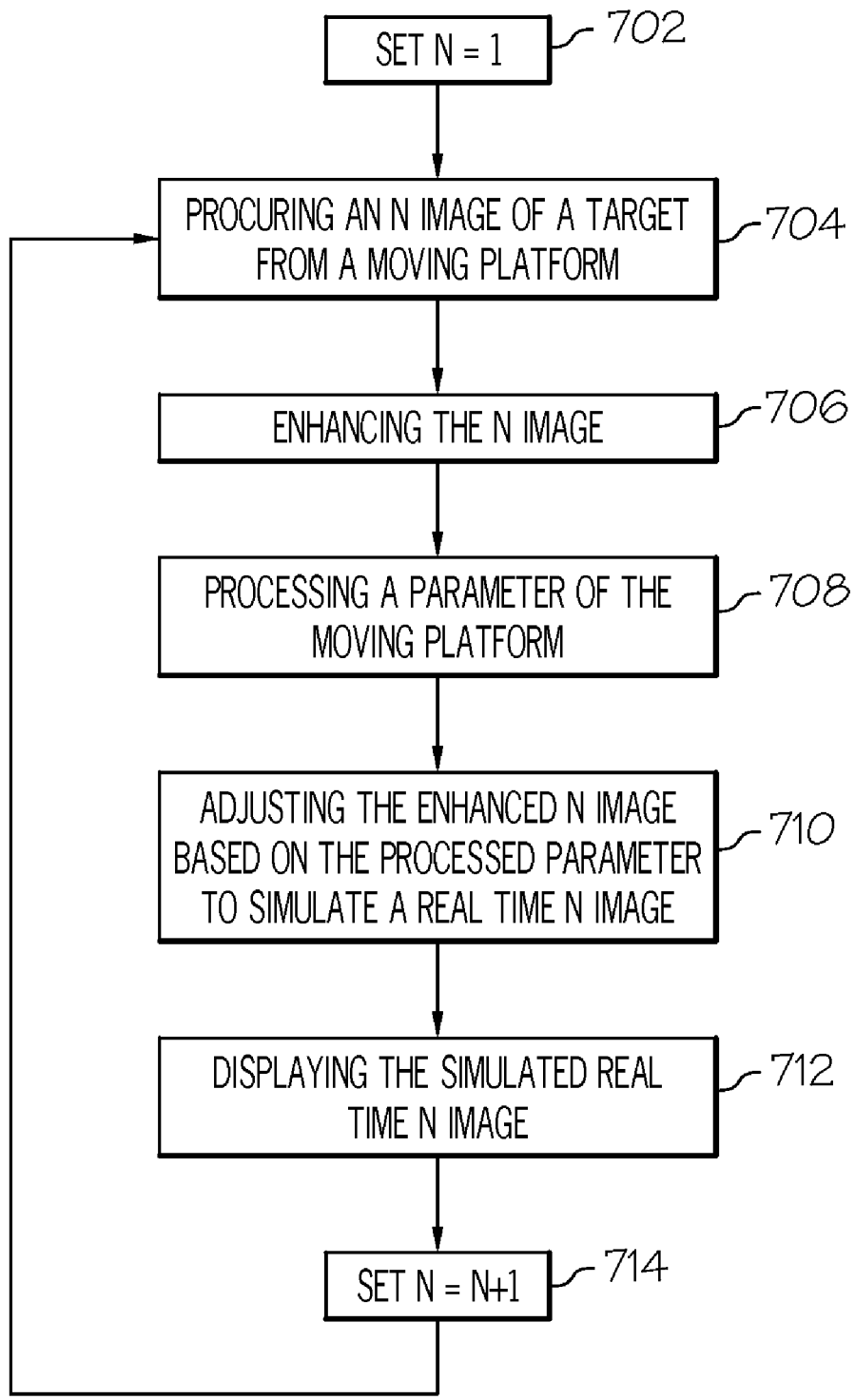
FIG. 7 is a flow chart of the steps illustrating a second exemplary embodiment.

Another exemplary embodiment is described in the flow chart of FIG. 7, including defining 702 N to equal 1, and procuring 704 an N image of a target from a moving platform. Parameters of the moving platform are processed 706. The N image is adjusted 708 based on the processed parameter to simulate a first real time N image, which is then displayed 710. N is then set 714 to N+1 and the process is repeated from step 704.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A method of displaying a real time image, comprising:
   generating a video comprising a plurality of images of a target viewed from a moving platform during a first period of time at a first distance;
   enhancing the plurality of images and the resolution of the video resulting in a delay of a time interval;
   continually processing at least one parameter of the moving platform indicative of the time interval;
   adjusting each of the plurality of images based on the processed at least one parameter to simulate a real time video for a second period of time at a second distance, the passage of time from the first period of time to the second period of time compensating for the delay; and
   displaying the simulated real time video simulating the visual dimensions for a current position for the moving platform.

2. The method of claim 1 wherein the processing a parameter step comprises:
   processing at least one of:
      platform parameters including at least one of:
         positional coordinates, altitude change rate, attitude, pitch and roll, heading, and speed, and
      vision system characteristics including at least one of:
         zoom setting, picture angle, and setting based on available reflection conditions based on environmental conditions.

3. The method of claim 1 wherein the processing a parameter step comprises:
   processing positional coordinates.

4. The method of claim 1 wherein the processing a parameter step comprises:
   processing heading.

5. The method of claim 1 wherein the processing a parameter step comprises:
   processing attitude.

6. The method of claim 1 wherein the adjusting step comprises
   changing at least one of:
      the relative position of the platform to the target, or
      the dimensions of the target.

7. The method of claim 1 wherein the adjusting step comprises:
   at least one of:
      changing the angle from which the target is viewed, or
      introducing certain distortions.

8. The method of claim 1 wherein the generating step comprises:
   generating a processed enhanced vision system video.

9. The method of claim 1 wherein the generating step comprises:
   generating an enhanced vision system video.

10. The method of claim 1 wherein the generating step comprises:
    generating an InfraRed image.

11. A method of displaying a real time image, comprising:
    a) setting N=1;
    b) procuring an N image of a target from a moving platform during a first period of time at a first distance;
    c) enhancing the N image resulting in a delay of a time interval;
    d) processing a parameter of the moving platform indicative of the time interval;
    e) adjusting the enhanced N image based on the processed parameter to simulate a real time N image for a second period of time at a second distance, the passage of time from the first period of time to the second period of time compensating for the delay;
    f) displaying the simulated real time N image simulating the visual dimensions for a current position for the moving platform;
    g) setting N=N+1; and
    h) repeating steps b through step h.

12. The method of claim 11 wherein the processing a parameter step comprises:
  processing at least one of:
    platform parameters including at least one of:
      positional coordinates, altitude change rate, attitude, pitch and roll, heading, and speed, and
    vision system characteristics including at least one of:
      zoom setting, picture angle, and setting based on available reflection conditions based on environmental conditions.

13. The method of claim 11 wherein the processing a parameter step comprises:
  processing positional coordinates.

14. The method of claim 11 wherein the processing a parameter step comprises:
  processing heading.

15. The method of claim 11 wherein the processing a parameter step comprises:
  processing attitude.

16. The method of claim 11 wherein the adjusting step comprises
  changing the dimensions of the target.

17. The method of claim 11 wherein the adjusting step comprises
  changing the angle from which the target is viewed.

18. The method of claim 11 wherein the generating step comprises:
  generating an enhanced vision system video.

19. An apparatus for displaying a real time image, comprising:
  an image procuring apparatus configured to procure a video including a plurality of images of a target viewed from a moving platform during a first period of time at a first distance;
  a processor configured to:
    enhance the images resulting in a delay of a time interval;
    process at least one parameter of the moving platform related to the relative position of the platform to the target and indicative of the time interval; and
    adjust the procured images based on the processed at least one parameter for a second period of time at a second distance, the passage of time from the first period of time to the second period of time compensating for the delay; and
  a display configured to display the adjusted images simulating the visual dimensions for a current position for the moving platform.

20. The apparatus of claim 19 wherein the image procuring apparatus comprises an enhanced vision system.

* * * * *